(12) United States Patent
Eberhardt, III et al.

(10) Patent No.: US 9,349,103 B2
(45) Date of Patent: May 24, 2016

(54) APPLICATION OF MACHINE LEARNED BAYESIAN NETWORKS TO DETECTION OF ANOMALIES IN COMPLEX SYSTEMS

(71) Applicant: DecisionQ Corporation, Washington, DC (US)

(72) Inventors: John S. Eberhardt, III, Jeffersonton, VA (US); Todd A. Radano, Jeffersonton, VA (US); Benjamin E. Peterson, Washington, DC (US)

(73) Assignee: DECISIONQ CORPORATION, Washington, DC (US)

( * ) Notice: Subject to any disclaimer, the term of this patent is extended or adjusted under 35 U.S.C. 154(b) by 516 days.

(21) Appl. No.: 13/737,687

(22) Filed: Jan. 9, 2013

(65) Prior Publication Data
US 2013/0198119 A1 Aug. 1, 2013

Related U.S. Application Data

(60) Provisional application No. 61/584,646, filed on Jan. 9, 2012.

(51) Int. Cl.
G06N 99/00 (2010.01)
G06N 7/00 (2006.01)

(52) U.S. Cl.
CPC ............. *G06N 99/005* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 7,274,822 | B2 * | 9/2007 | Zhang et al. | 382/224 |
| 8,903,920 | B1 * | 12/2014 | Hodgson | 709/206 |
| 2008/0184371 | A1 * | 7/2008 | Moskovitch et al. | 726/24 |
| 2012/0185728 | A1 * | 7/2012 | Guo et al. | 714/26 |

OTHER PUBLICATIONS

Asamina, Michel et al., "Bayesian Statistics in Oncology: A guide for the Clinical Investigator," American Cancer Society, Cancer 2009; 115:5371-5381.

Biagioli, Bonizella et al., "A multivariate Bayesian model for assessing morbidity after coronary artery surgery," Critical Care 2006, 10:R94, 13 pages.

Burd, Randall S. et al., "Bayesian Logistic Injury Severity Score: A Method for Predicting Mortality Using International Classification of Disease-9 Codes," Society for Academic Emergency Medicine, Academic Emergency Medicine, May 2008, 15(5):466-475.

Burnside, Elizabeth S. et al., "Bayesian Network to Predict Beast Cancer Risk of Mammographic Microcalcifications and Reduce Number of Benign Biopsy Results: Initial Experience," Radiology, Sep. 2006, 240(3):666-673.

(Continued)

*Primary Examiner* — Kakali Chaki
*Assistant Examiner* — Michael Zidanic
(74) *Attorney, Agent, or Firm* — Arent Fox LLP

(57) ABSTRACT

According to one embodiment, in response to a set of data for anomaly detection, a Bayesian belief network (BBN) model is applied to the data set, including for each of a plurality of features of the BBN model, performing an estimate using known observed values associated with remaining features to generate a posterior probability for the corresponding feature. A scoring operation is performed using a predetermined scoring algorithm on posterior probabilities of all of the features to generate a similarity score, wherein the similarity score represents a degree to which a given event represented by the data set is novel relative to historical events represented by the BBN model.

36 Claims, 10 Drawing Sheets

(56) References Cited

OTHER PUBLICATIONS

Cao, Cungen et al., "Dynamic Decision Analysis in Medicine: A Data-Driven Approach," International Journal of Medical Informatics, Jul. 1198, 51(1):13-28.
Crump, Cindy et al., "New Tools and Techniques for Intelligent Health Monitoring," AMIA 2008 Annual Symposium, 6 pages.
Edwards, Fred H. et al., "Use of a Bayesian statistical model for risk assessment in coronary artery surgery," Annals of Thoracic Surgery, Apr. 1988, 45:437-440.
Elster, Eric A. et al., "Probabilistic (Bayesian) Modeling of Gene Expression in Transplant Glomerulopathy," Journal of Molecular Diagnostics, Sep. 2010, 12(5):653-663.
Erkanli, Al et al., "Application of Bayesian Modeling of Autologous Antibody Responses against Ovarian Tumor-Associated Antigens," Cancer Research, Feb. 1, 2006, 66(3):1792-1798.
Forsberg, Jonathan Agner et al., "Estimating Survival in Patients with Operable Skeletal Metastases: An Application of a Bayesian Belief Network," PLoS ONE, May 2011, 6(5):e19956.
Ho, K.M. et al., "Bayesian approach to predict hospital mortality of intensive care readmissions during the same hospitalisation," Anasthesia and Intensive Care, Jan. 2008, 36(1), 10 pages.
Hoot, Nathan et al., "Using Bayesian Networks to Predict Survival of Liver Transplant Patients," Proceedings AMIA 2005 Symposium, 345-349.
Maskery, Susan M. et al., "A Bayesian derived network of breast pathology co-occurrence," Journal of Biomedical Informatics, 2008, 41:242-250.
Peterson, Lori T. et al., "Assessing Differences Between Physicians' Realized and Anticipated Gains from Electronic Health Record Adoption," Journal of Medical Systems, Jul. 2009, 35(2):151-161.
Robin, Howard et al., "Interpreting diagnostic assays by means of statistical modeling," IVDT, Apr. 2006, 12(3):55-63.
Sampson, Maureen et al., "Bayesian Delta Error Value: A new metric for near real-time error detection," 2006 American Association for Clinical Chemistry Meeting, Proceedings of, Chicago, IL, 5 pages.
Smith, Heath A. et al., "IgG Responses to Tissue-Associated Antigens as Biomarkers of Immunological Treatment Efficacy," Journal of Biomedicine and Biotechnology, 2011, Vo. 2011, Artivle ID 454861, 10 pages.
Steele, Scott et al., "Using Machine-Learned Bayesian Belief Networks to Predict Perioperative Risk of Clostridium Difficile Infection Following Colon Surgery," Interactive Journal of Medical Research, 2012, 1(5):e6.
Stojadinovic, Alexander et al., "Development of a clinical decision model for thyroid nodules," BMC Surgery, Aug. 2010, 9:12.
Stojadinovic, Alexander et al., "Development of a Bayesian model to estimate health care outcomes in the severely wounded," Journal of Multidisciplinary Healthcare, 2010:3 125-135.
Stojadinovic, Alexander et al., "Development of a Bayesian Classifier for Breast Cancer Risk Stratification: A feasibility Study," ePlasty Open Access Journal, Mar. 2010, 10:203-216.
Van den Hout, Ardo et al., "Estimating dementia-free life expectancy for Parkinson's patients using Bayesian inference and microsimulation," Biostatistics, 2009, 10(4):729-743.
Weinstein, Lawrence et al., "Application of Multivariate Probabilistic (Bayesian) Networks to Substance Use Disorder Risk Stratification and Cost Estimation," Perspectives in Health Information Management, Fall 2009, vol. 6, pp. 1-27.

* cited by examiner

APPLICATION OF MACHINE LEARNED BAYESIAN NETWORKS TO DETECTION OF ANOMALIES IN COMPLEX SYSTEMS

RELATED APPLICATIONS

This application claims the benefit of U.S. Provisional Patent Application No. 61/584,646, entitled "Application of Machine Learned Bayesian Networks the Detection of Anomalies in Complex Systems," filed Jan. 9, 2012, which is incorporated by reference herein in its entirety.

FIELD OF THE INVENTION

Embodiments of the present invention relate generally to machine learned Bayesian network modeling. More particularly, embodiments of the invention relate to the use of machine-learned Bayesian networks to detect anomalies in a complex system.

BACKGROUND

A Bayesian belief network (BBN) is a directed graph and an associated set of probability tables. The graph consists of nodes and arcs. The nodes represent variables, input data for which can be discrete or continuous; however the BBN must segment continuous data into parameterized ranges. The arcs represent causal or influential relationships between variables. More specifically, a BBN is a probabilistic graphical model that represents a set of random variables and their conditional independencies. It is a way of describing complex, probabilistic reasoning.

Machine learning is a field of computer science that uses intelligent algorithms to allow a computer to mimic the process of human learning. The machine learning algorithm allows the computer to learn information structure dynamically from the data that resides in the data warehouse. The machine learning algorithms automatically detect and promote significant relationships between variables, without the need for human interaction. This allows for the processing of vast amounts of complex data quickly and easily. This also allows for a computer to discover the structure of the BBN without specification by a human operator.

The machine learning models can be scored in different ways: Minimum Description Length (MDL), also known as the Bayesian Information Criterion (BIC), as well as Bayesian Scoring. MDL scoring provides a measure of the quality of a model. It trades off between goodness of fit and model complexity (parsimonious scoring). Goodness of fit is measured as the likelihood of the data given the model. Model complexity equals the amount of information required to store the model, subject to an inflator/deflator set by the user. The BBN networks and/or machine learning models have not been previously utilized in policy decision making processes of insurance plans or in selection of enrollees for disease management or care interventions.

Typically BBNs are used to predict the probability of known events. However, in some situations, there is a need to predict certain unknown events that are dissimilar to certain known events. For example, there is a need to detect new virus or malware that has not been detected before, to detect certain telecommunications network activities that are abnormal but unknown, or to detect aberrations in biological networks to identify potentially sick individuals before they become symptomatic. Conventional malware or network activities detection systems lack efficient ways for such purposes, while conventional clinical diagnostics evaluate individual system elements rather than a system as a whole.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
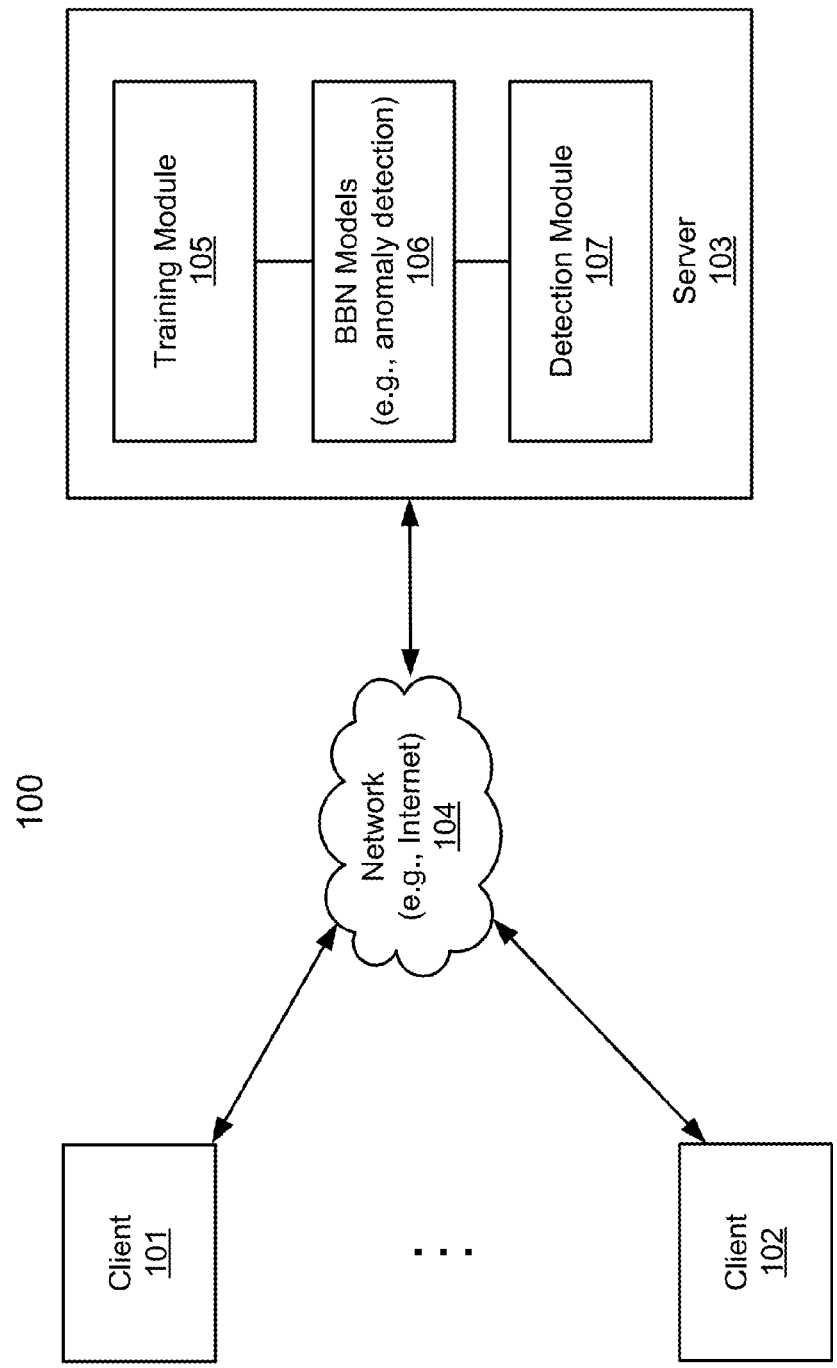
FIG. 1 is a block diagram illustrating a network system that can be used with an embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, machine-learned Bayesian Belief Networks (BBNs) are utilized to identify anomalous events in complex systems. One such application is determining the likelihood that software executables are malware. Another application is examining internet protocol packets to determine if the traffic they represent is legitimate or part of an attack. Another application would be quality control in complex manufacturing processes in order to detect products out of variance, such as electronics or chemicals. Another application would be studying biomarkers or physiology to detect subtle shifts in biology that would allow the user to detect when a patient is about to become dysregulated or ill. Since these are very complex systems, classical rules based systems often require simplification of the system in order to make the rules tractable.

An embodiment of the invention applies machine-learning algorithms to complex data sets in order to train full BBNs from these data sets. These known networks are then used to score a new event in the context of the known network by comparing the estimated structure to the observed structure on all vectors. The machine learning algorithms used are a heuristic search algorithm that uses greedy learning and learning queues to discover network structure. It is a form of genetic algorithm. The result is a BBN, which is a directed acyclic graph of conditional independence between features within the domain.

An embodiment of the invention provides a method for identifying events that are novel or anomalous relative to other events in a complex system. In one embodiment, such a method comprises: 1) extracting key features from a data set; 2) using machine learning algorithms to build a BBN(s) that is a graph representation of conditional probabilities between individual event attributes; 3) deploying the BBN in a software application that uses known information to estimate unknown information; and 4) comparing the estimated feature set to the observed feature set an calculating an anomaly score. Events could include downloaded a software application, an IP session, an email message, or a product coming off a production line.

In one embodiment, a BBN model can be created by: 1) parsing a text file containing a set of data to identify critical features; 2) identifying those features which have adequate data quality; 3) optionally transforming the parsed features into a tabular file; 4) separating the data into training set and holdout sets; 5) using one or more machine learning algorithms on the training set data to train a series of BBNs; 6) validating the selected BBN on the holdout set data; and 7) deploying the BBN to score future instances for degree of dissimilarity to a known system.

Once the BBN models have been created, according to one embodiment, when a new set of data is received for determining characteristics of the data, a set of features is extracted from the set of data. One or more ml-BBN models (simply referred to as BBN models for simplicity hereinafter) are applied to provide an estimate of each feature (e.g., representing a possible unknown event), given known observed values of the remaining features (e.g., representing known events) in the data set (also referred to as domain). For a set of N features, the BBN model(s) generates N estimates, one for each feature given the remaining (N−1) features. Thereafter, a scoring algorithm is applied to all the estimates to generate a similarity or dissimilarity score, representing whether the particular set of data is similar or dissimilar (e.g., anomaly) to a set of known events.

FIG. 1 is a block diagram illustrating a network system that can be used with an embodiment of the invention. Referring to FIG. 1, network system 100 includes, but is not limited to, one or more clients 101-102 communicatively coupled to server 103 over network 104. Network 104 may be a local area network (LAN), a wide area network (WAN) such as the Internet, or a combination thereof. Clients 101-102 may be implemented as any kind of devices, such as desktops, laptops, mobile communications devices, biological analyzer, etc. Server 103 may be a Web server or an application server. For example, clients 101-102 may include certain anti-virus or malware detection systems that are configured to collect certain data from the system and to provide the data to server 103 for actual detection using BBN models as described in details further below. Clients 101-102 may be network traffic monitoring device to monitor network access patterns to detect abnormal network accesses. Clients 101-102 may include molecular analyzers operating on a laboratory network providing biomarker data back to the server for model training and detection. Alternatively, the BBN models may be deployed in clients 101-102 to perform the actual detection and the results may be transmitted back to server 103 for further analysis.

In one embodiment, server 103 includes, but is not limited to, a training module 105, one or more BBN models 106, and a diagnostic module 107. Training module 105 is configured to obtain a set of data as a training corpus, for example, from one or more data providers, to train and produce one or more BBN models 106 using one or more machine learning algorithms, such as, for example, the FasterAnalytics™ software suite from DecisionQ Corporation of Washington, D.C. The machine learning algorithms use a heuristic search mechanism and information scoring metric to automatically detect and promote significant relationships between variables, without the need for human interaction. This allows for the processing of vast amounts of complex data quickly and easily. The BBN models 106 are then utilized by detection module 107 to provide an estimate of probability that the set of data is similar or dissimilar to a known event. In one embodiment, BBN models 106 are utilized to perform anomaly detection for each of the features in a data set, given the remaining features within the data set.

Figure 2:
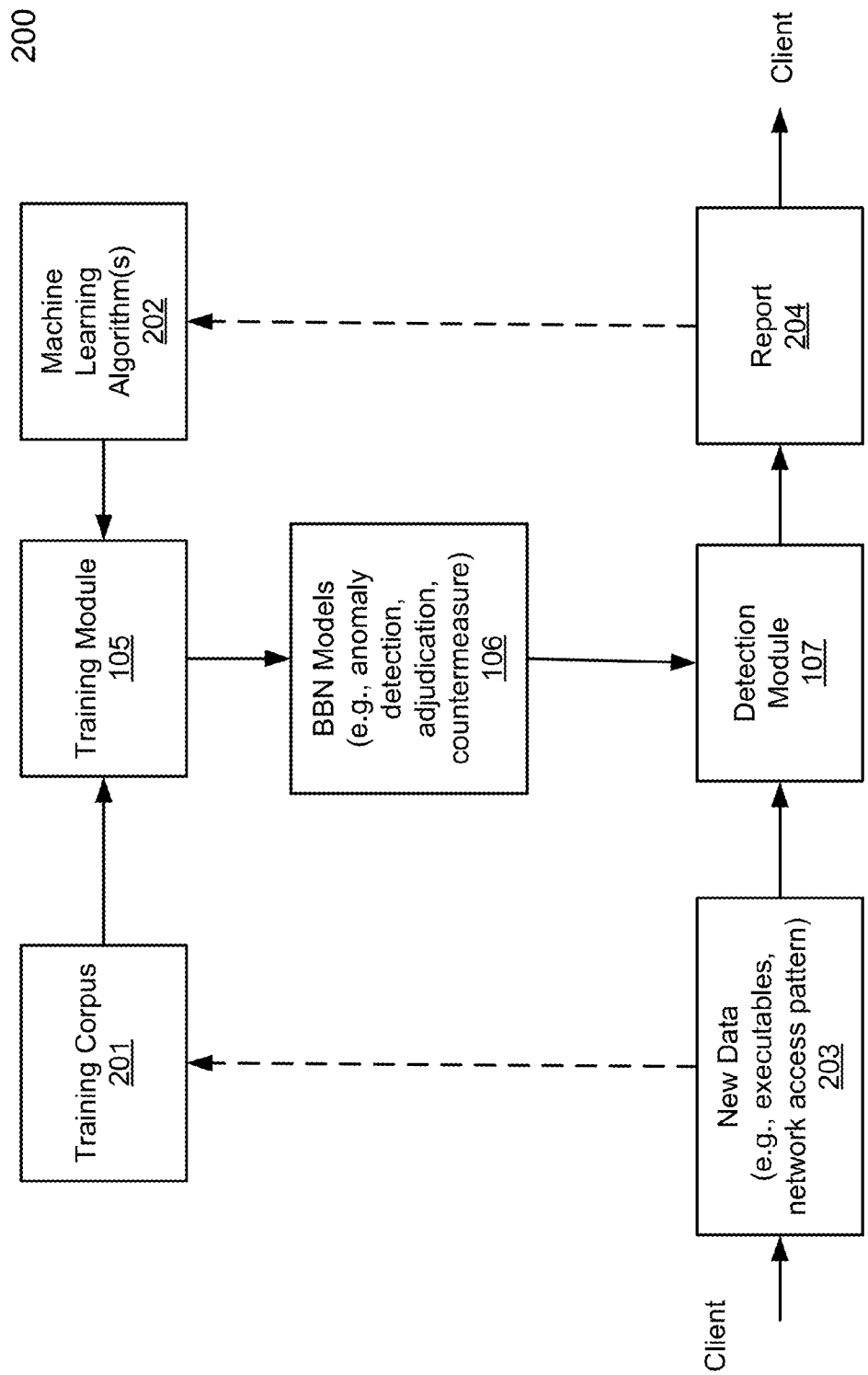
FIG. 2 is a block diagram illustrating a system for modeling BBN models for diagnosis according to one embodiment of the invention.

FIG. 2 is a block diagram illustrating a system for modeling BBN models for diagnosis according to one embodiment of the invention. For example, system 200 may be implemented as part of server 103 of FIG. 1. Referring to FIG. 2, system 200 includes training module 105 configured to train a set of training corpus 201, which may represent a set of data (e.g., malware, network traffic patterns, a set of genetic biomarkers) obtained from one or more data providers or other entities, to generate one or more BBN models 106 using one or more machine learning algorithms 202. BBN models 106 includes at least one anomaly detection model that performs anomaly detection on each of the N features in a data set, given known observed values of the remaining (N−1) features of the data set to generate an estimate for that selected feature, and to aggregate the estimates of all N features to derive a similarity score. BBN models 106 may be utilized subsequently by diagnostic model 107 to perform anomaly detection on new set of claim data 203 and to provide a report 204 to the client. Data 203 and report 204 may be fed back to the training system for future training and/or adjustment of BBN models 106.

Figure 3:
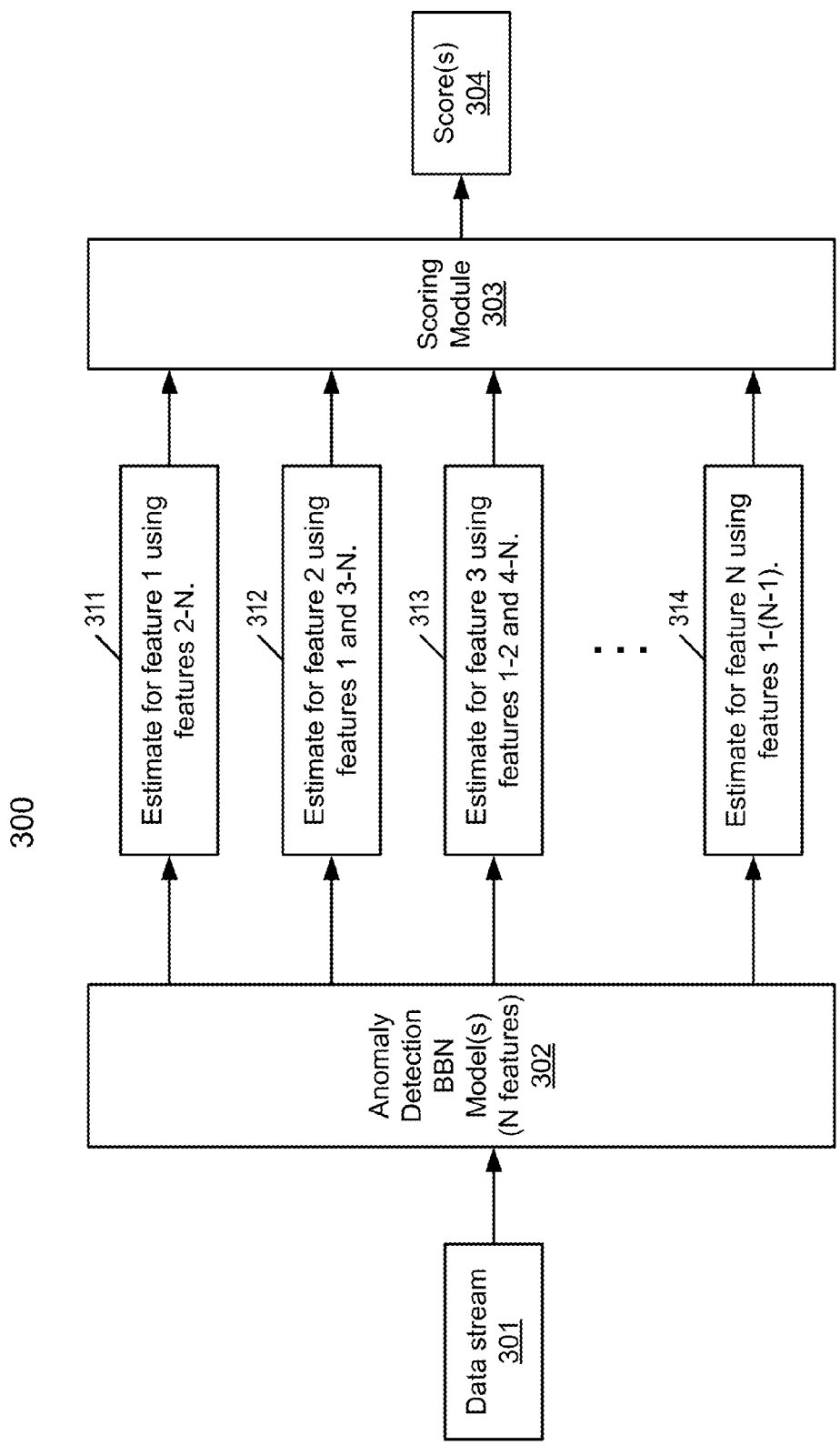
FIG. 3 is a block diagram illustrating an anomaly detection system using BBNs according to one embodiment of the invention.

FIG. 3 is a block diagram illustrating an anomaly detection system using BBNs according to one embodiment of the invention. System 300 may be implemented as part of system 200 of FIG. 2. Referring to FIG. 3, when a new set of data 301 is received, features of data set 301 are extracted, for example, by a parser (not shown) of system 300. The extracted features are provided to one or more BBN models 302 that have been previously created and trained using a set of training data and holdout data. In this example, there are N features in data set 301 and/or BBN models 302. In one embodiment, BBN models 302 are used to perform anomaly detection for each of the N features given the remaining (N−1) features, i.e., using known observed values of the remaining (N−1) features. As a result, N estimates 311-314 are generated and may be assigned with a score representing whether the estimate of each particular feature is likely similar to an event associated with or represented by that feature, given the rest of the (N−1) features (excluding the feature in question). For example, estimate 311 represents the likelihood that the estimated value of feature 1 in data set 301 is similar to the observed value of feature 1 in data set 301, given know events associated with features 2 to N, and so on. The estimates 311-314 are then fed into scoring module 303 to be aggregated or analyzed to generate a final score or scores 304. Score(s) 304 represents the overall likelihood that any given record in data set 301 is similar or dissimilar to certain event or events represented by all N features in BBN model(s) 302.

According to one embodiment, the anomaly detection ml-BBN is used to provide a posterior probability for each feature in the model using all the other known features in the model. For example, if a model has features A, B, C, and D; A, B, and C are used to calculate a posterior probability distribution for D; B, C, and D are used to calculate a posterior probability distribution for A; C, D, and A are used to calculate a posterior probability distribution for B; and A, B, and D are used to calculate a posterior probability distribution for C. The estimated values for each of A, B, C, and D are represented as posterior distributions of likely outcomes. (e.g., in a positive/negative binary distribution potential posteriors could range from 0%/100% to 20%/80%, to 100%/0% or anything in between). The estimated outcome for each feature (positive/negative) is compared to the actual observed value for each feature (positive/negative) and each feature is scored. This can be as simple as assigning a 0 or 1 to each feature to indicate that the estimated distribution agrees with the observed distribution, or can be a more complex distance metric that calculates the concordance between the estimated and observed distribution. These metrics of agreement for each feature A, B, C, D are then aggregated into an overall Similarity Score for the record or population being evaluated—a high similarity score means that the record or population being evaluated is very similar systemically to the training population.

Scoring is a part of the process that interprets the output of the BBN models. In one embodiment, the scoring has two components: 1) an anomaly scoring algorithm that converts the posterior probabilities from the anomaly detection ml-BBN into a single score; and 2) flexible adjudication that allows a user to make effective use of the scores and posterior probabilities generated the anomaly scoring algorithm. The anomaly scoring algorithm is designed to show, based on multivariate probabilistic pattern comparison, how similar an event is to a set of historic, adjudicated events that are, for example in a malware detection situation, either benign or harmful.

Figure 4:
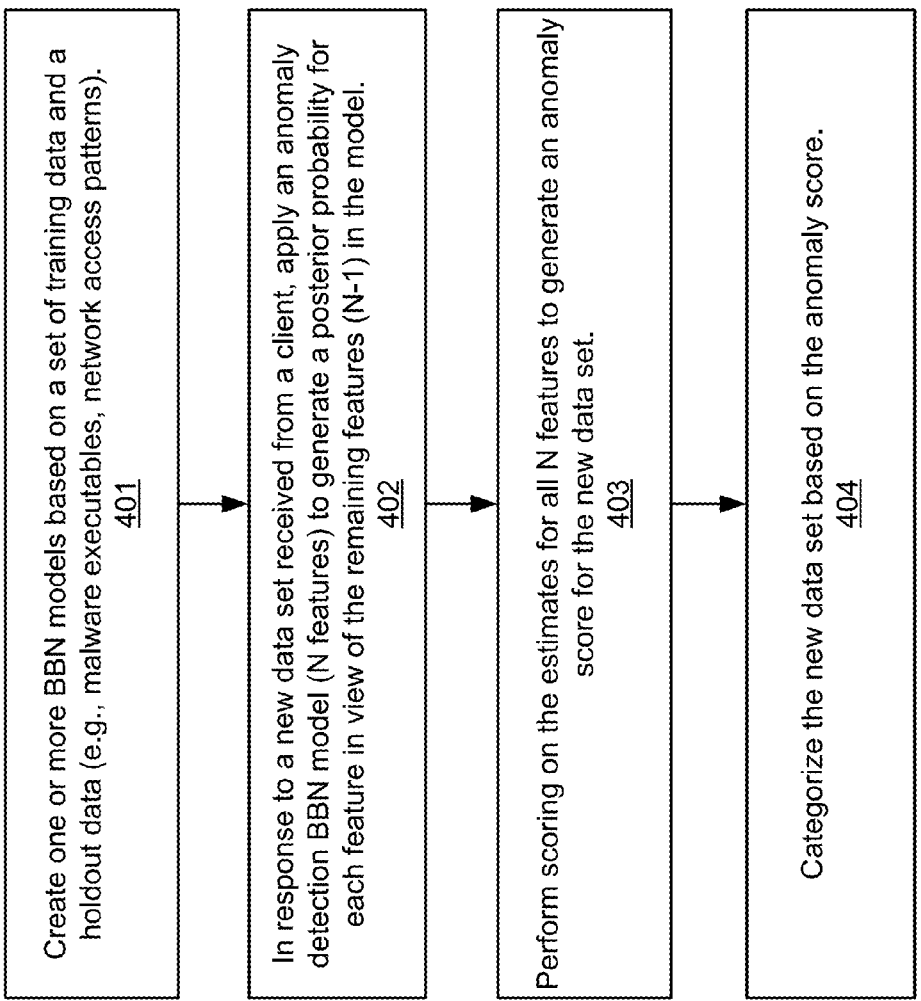
FIG. 4 is a flow diagram illustrating a method for anomaly detection using BBN models according to one embodiment of the invention.

FIG. 4 is a flow diagram illustrating a method for anomaly detection using BBN models according to one embodiment of the invention. Method 400 may be performed by system 300 of FIG. 3, which may be implemented as processing logic in software, hardware, or a combination thereof. Referring to FIG. 4, at block 401, one or more BBN models are created based on a set of training data and a set of holdout data. At least one of the BBN models is an anomaly detection model as described above. In response to a new data set received from a client, at block 402, processing logic applies an anomaly detection BBN model to perform an estimate for each of the features in the model using known distributions of the remaining features. In one embodiment, processing logic applies the BBN model to generate a posterior probability for each feature in view of the remaining features in the model. At block 403, processing logic performs a scoring operation on the estimates for all features to generate an anomaly score for the new data set. At block 404, the anomaly score is used to categorize the new data set.

Figure 5:
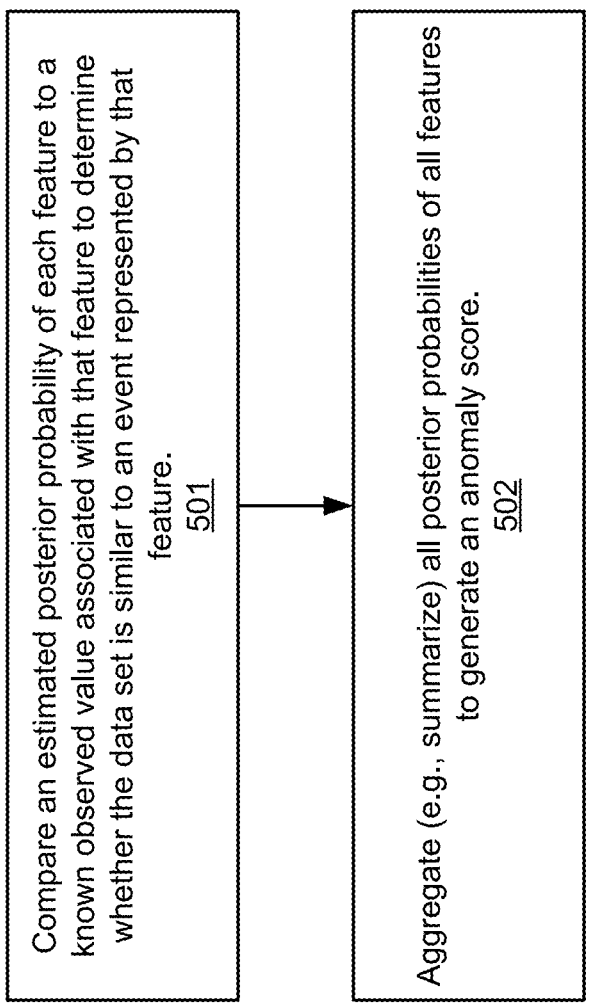
FIG. 5 is a flow diagram illustrating a method of scoring for anomaly detection according to one embodiment of the invention.

FIG. 5 is a flow diagram illustrating a method of scoring for anomaly detection according to one embodiment of the invention. Method 500 may be performed as part of operations in block 403 of FIG. 4. Referring to FIG. 5, at block 501, processing logic compares an estimated posterior probability of each feature to a known observed value associated that feature to determine whether the data set is similar to an event represented by that feature. At block 502, processing logic aggregates all posterior probabilities of all features to generate an anomaly score. In one embodiment, processing logic sums the individual estimated scores for all of the features to derive a final similarity/dissimilarity score.

The techniques of anomaly detection using BBN models described above can be applied to a variety of situations. In one embodiment, the techniques described above can be applied to cyber security, malware detection, communications monitoring, quality control, operation security, detection of anomalies (illness) in biological networks, and social media monitoring areas.

Cyber security represents one of the most challenging problems in analysis and security. It represents a fundamentally different paradigm from classic security in that cyber attacks usually attack multiple targets in sequence, use extensive camouflage, can come from both inside and outside the network, and usually require the cyber security analyst to make rapid decisions on partial information. While sophisticated programmers and system administrators can defend against these attacks, the newest generation of the most sophisticated attacks required a rapid, specific response in real-time using partial information and time series information.

Unfortunately, the conventional technical approaches usually rely on classical security approaches. These approaches consist of either a layered "fortress" approach, a "signature" based approach, a "post facto" approach, or usually a combination of all three. These approaches tend to be backward-looking rather than predictive. All these applications are relatively static, focused on performing basic calculations on small, structured records with well-formed, consistent, and complete data. They are effectively classical security applications scaled to run faster on more powerful hardware, doing what batch processing systems used to do, only faster. These approaches cannot provide a moving target threat response because they are not dynamic technologies and cannot make attributions and responses using incomplete data.

The fortress approach uses access-control to reduce security vulnerability, including network design, controlled access points, and identity verification. Examples of the Fortress approach include password protection, closed ports, computer media access control (MAC) address verification, and hardware based firewalls. While the fortress approach defeats many attacks, like any fortification, it has weak points. These weak points include user identity theft, brute force attacks, and attack designs that were not anticipated when the security design was developed. The Fortress design is completely static. As a result, Fortresses are often slow to respond to emerging threats.

The signature approach uses known attack signatures to design security rules and analyses that can catch attacks in progress. Examples of this approach include IP address blocking, identification of suspicious packets, and de-activation of protocols and software features known to create vulnerabilities. The challenge with the classical Signature approach is that it is static and requires complete records—the attack design must be observed completely before the signature can be designed and implemented. Thus, the deployment of countermeasures is static rather than dynamic and often fails to accurately analyze or attribute new attacks. This leaves the signature approach highly vulnerable to newly created cyber attack methods and unable to provide real time response to potential attacks with sufficient sensitivity and specificity.

The post facto approach consists of shutting down networks once a cyber attack has been identified. Examples of this approach include closing ports, shutting down machines, and disabling user access to databases. This approach is equivalent to flooding the castle moat once the outer walls have been breached. The challenge with the Post Facto approach is that it is completely retrospective and does not deliver countermeasures in real time to raise the cost of attack. It requires an actual breach to occur before action is taken. While this approach usually halts the attack, it only halts it once damage has already occurred.

The essential problem with the fortress/signature/post Facto approach to cyber security is that it is essentially a static, backward-looking approach. Critical shortcomings include:
- The inability to handle incomplete and dirty data, since an attack signature usually assumes that information is complete and accurate;
- The inability to quickly analyze complex or disparate data to derive actionable insights;
- The inability to support mixed initiative analysis and response in real time as the rules are usually pre-defined and thus static; and
- The inability to compare streaming data against models of expected data to identify and respond to new attack designs in real time.

According to one embodiment, the techniques described above can be used to address these challenges using an approach referred to as the "sentinel" approach. The approach uses machine-learning algorithms, an n-dimensional modeling space, and a model interpretation application to develop dynamic models of cyber attacks that can respond to incomplete or partial information to identify and respond to new attack designs in real time. We term this the sentinel approach because, like a sentinel, the system learns from its environment and draws logical conclusions from experience and the information at hand.

Automated malware analysis has been the subject of much research and development by both academia and the commercial sector in recent years. Throughout this time the behaviors, complexity, and volumes of malware have increased significantly. Clearly, while signature based intrusion detection systems (IDS) and antivirus (AV) systems will remain a mandatory low bar for security, the need for further improvement of non-signature based approaches is more obvious than ever.

The commercial sector has not sat idly by and indeed has implemented various malware detection engines and methodologies using signatures, heuristics, artificial intelligence (AI), inline sandboxing, and trust models. However malware has evolved to meet and exceed the capacity of AV vendors to analyze malware in or near real time. For a while AV vendors could merely identify specific features of malware and only required having a large and current database of malware features or signatures. Even early packing did not pose a significant threat a few years ago, and anomaly detection could be used to distinguish packed samples from unpacked samples. Once a sample was identified as packed the AV software could unpack it using a one of its static un-packers.

More recently malware comes in a large variety of packed forms, with new packers arriving daily or weekly. Many packers cannot be unpacked by a standard static unpacking and may require generic unpacking technology or manual unpacking using a debugger. Packers have also evolved to include encryption further reducing the likelihood of an AV product can do its job statically. Finally, there are malware toolkits for sale that automate the generation of malware families with a variety of features and that generate different looking binaries. This makes it very difficult to compare binary features and declare similarity to existing known malware based on anything but an exhaustive malware analysis and reverse engineering approach. This has forced malware researchers to look to alternative approaches to automated malware analysis.

While tremendous progress in malware detection and classification has been made, the continued high rate of malware penetrations show that there is still much work to do in combating this problem. The shortcomings of the current approach are that it tends to be very time consuming and labor intensive, and does not support true real time detection because of the high number of combinatorial malware variants.

Some notable modern malware detection engines have taken extended AV oriented approaches; some literally sandbox binaries as they move across the wire and searches for behavioral characteristics during a pseudo execution, other products sandbox the entire browser and looks for behavioral characteristics as well while the browser is running. However, these, are real time products and appear to be limited to determining if it is likely malware. The academic community has been working on the problem and has provided a variety of approaches to enhance the automation of malware analysis. Notable research attempts include various analytically based methodologies that extract knowledge from a corpus of known good and bad and create math models that can analyze unknown samples and determine badness, goodness, and likely family heritage. Popular math models include Clustering, Inductive Rule Engines, Naïve Bayes, Support Vector Machines, Decision Trees, Instance Based Learning, Markov Models, as well as other statistically based models. The models use data from n-grams extracted from binaries or feature vectors derived from structural characteristics of the binary datasets.

The efficacy of these methodologies appears good for laboratory results, but little is known of how well these models work in real world environments. The bulk of research seems to be geared towards determining if a sample is malware. What it might be is largely determined by virtue of a similarity. Sandboxing and manual reverse engineering appear to remain the trusted methodologies for determining behavior. While it is not clear which if any commercial products use combinatorial analytical methodologies it does appear that these techniques show promise based on research results.

The challenge with many approaches to malware classification is that they are still fundamentally signature-based approaches—while they may be able to use more complex or partial signatures, they are still combinatorially limited in capacity. In order to truly enable real-time detection of malicious executables, we need to be able to score feature combinations (signatures) that have not been previously observed, and to be able to consider several orders of magnitude more combinations than have been studied previously.

According to one embodiment, the techniques described above can be used to address these challenges using a technique referred to as the "Combinatorial Anomaly Detection" (CAN) approach. The approach uses machine-learning algorithms combined with an n-dimensional modeling space to develop dynamic models of malware features that allow users to analyze observed features sets combinatorially. Users can take new executables and compare their feature structure to the set of likely combinations for both malicious and non-malicious executables to provide novel scores of the likelihood of malicious content. They will then use statistical methods to identify scoring thresholds which optimize sensitivity and specificity for referring suspect malware for further adjudication and deployment of countermeasures/neutralization.

In one embodiment, such a technical approach consists of three key components: 1) machine learning algorithms, 2) BBNs, and 3) a scoring rule. The machine-learning algorithms are utilized to training data sets to learn BBN structures natively from the data. BBNs are directed acyclic graphs of conditional dependencies between features that allow users to understand how different features interact, and to calculate posterior probability of an outcome given prior knowledge. The BBNs use patterns of conditional dependence between associated executable features to enable discrimination between malicious and non-malicious executables, as well as a subsequent set of models to identify similar variants and potential actions for use in countermeasure deployment.

According to one embodiment, machine-learning algorithms are used to training data sets to learn BBN structures natively from data. BBNs are directed acyclic graphs of conditional dependencies between features that allow users to understand how different features interact, and to calculate posterior probability of an outcome given prior knowledge. Our networks use patterns of conditional dependence between associated executable features to enable discrimination between malicious and non-malicious executables, as well as a subsequent set of models to identify similar variants and potential actions for use in countermeasure deployment.

In one embodiment, the first adjudication tier includes a single model trained on both malware and benign samples. This model is the first stage in classification for new executables with an output for probability of maliciousness given the extracted features. This model may be developed using an iterative process that isolates the most essential features for information content. In one embodiment, the final classification model consisted of only 20 of the original 328 data features available for prediction (3 of the original 331 features were outcome based).

The second adjudication tier includes two ml-BBNs; one model trained on malware samples and one model trained on benign samples. These two models provide network structures for "expected" or known types of executables. The idea behind this is to develop a similarity metric that aides in further discrimination of executables. Thresholds can be set for each output (classification, malware similarity, and benign similarity) to enhance these discriminatory capabilities. Additionally, the similarity models can be retrained overtime to incorporate new information about known malware and benign executables.

The similarity metric was calculated by predicting the most likely state for each node in the model of connected features to the value that was actually observed for testing observations as well as any new observations (e.g. new executables). If these two values agreed (predicted equals actual) then the observed node in question is said to be similar to the training population and given a positive score. If these values differed, the node is said to be dissimilar and assigned a negative or neutral score. These scores are then aggregated to obtain an overall similarity metric. This number is then used for statistical validation and decision tuning based on the results similar to standard classification methods such as sensitivity/specificity analysis. In other words, a new executable has N observed data elements. Given a BBN with the same data elements, each observed value can be predicted given the other data (N−1) values. This produces a most likely state given the model and observed information. The similarity metric is then calculated as an overall metric (using average correct prediction with varying weights for each node based on importance within the network/model).

Figure 6:
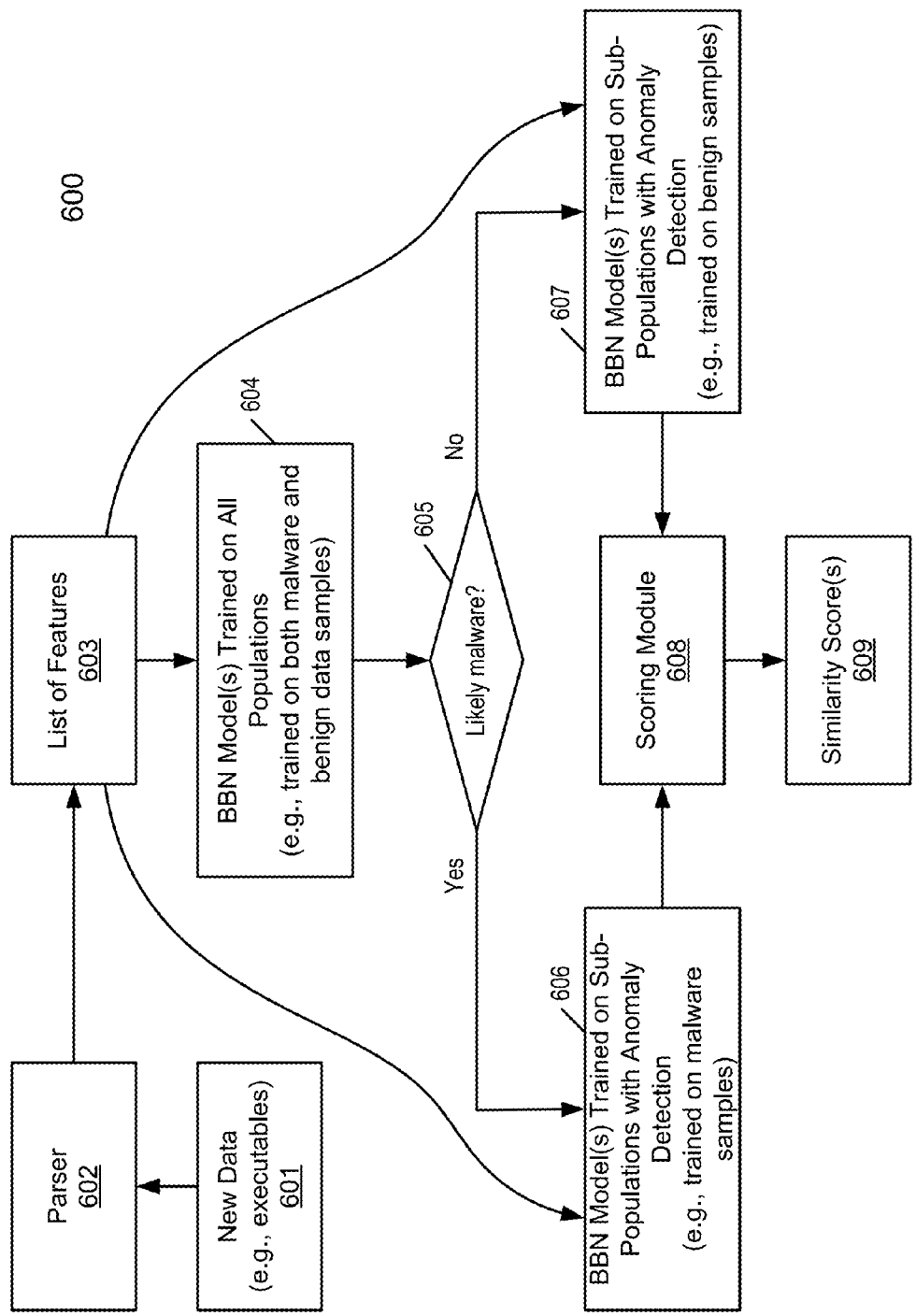
FIG. 6 is a block diagram illustrating a process for malware detection using BBNs with anomaly detection according to one embodiment of the invention.

FIG. 6 is a block diagram illustrating a process for malware detection using BBNs with anomaly detection according to one embodiment of the invention. Referring to FIG. 6, it is assumed BBN models 604 and 606-607 have been trained using a set of training data and a set of holdout data as described above. In one embodiment, BBN model 604 has been trained on all populations, while BBN models 606-607 are trained on certain sub-populations with respect to malware detection. For example, BBN model 604 has been trained on both malware sample data and non-malware sample data (also referred to as benign sample data). BBN model 606 and model 607 have been trained on malware sample data and benign sample data, respectively. Once BBN models 604 and 606-607 have been trained, they can be used to detect malware (e.g., previously unknown malware).

According to one embodiment, when new data 601, such as executables, is received, parser 602 is configured to parse new data 601 to extract or identify a list of features 603. Feature list 603 is then fed into BBN model 604, which is referred as the first tier of BBN models. In this embodiment, BBN model 604 has been trained on both malware and non-malware sample data. An output from BBN model 604 represent an estimate of probability indicating the likelihood that data set 601 represent malware. In one embodiment, an output of BBN model 604 is compared to a predetermined threshold associated with BBN model 604. If the output of BBN model 604 is greater than the predetermined threshold determined at block 605, it means that data set 601 is more likely considered as part of malware.

In one embodiment, if the output of BBN model 604 indicates that data set 601 is more likely considered as part of malware, BBN 606 is applied to feature list 603, where BBN 606 has been trained based on malware sample data as the second tier of BBN models. In one embodiment, BBN 606 includes functionality of anomaly detection as described above with respect to FIG. 3. The output of BBN model 606 is fed into scoring module 608 to generate a final similarity score 609. Similarly, if the output of BBN model 604 indicates that data set 601 is more likely considered as part of benign executable, BBN 607 is applied to feature list 603, where BBN 607 has been trained based on benign sample data as the second tier of BBN models. In one embodiment, BBN 607 includes functionality of anomaly detection as described above with respect to FIG. 3. The output of BBN model 607 is fed into scoring module 608 to generate a final similarity score 609. As a result, even if data set 601 is new and has not seen before, by employing two-tier BBN models, particularly anomaly detection BBN model 606 and/or BBN model 607, data set 601 can be estimated whether it is similar or dissimilar to malware based on its similarity score 609.

Modern communications networks are extremely complex. With the advent of mixed modality communications (wired, wireless, internet protocol, email) entities are often communicating simultaneously across multiple modes. This presents unique challenges in the areas of network management, network optimization, and securing and monitoring communications.

Embodiments of the invention would allow large data sets of network traffic, organized by type and node, to be used to train a machine-learned BBN that would be representative of communications patterns within a population. These estimated patterns could then be compared with observed patterns to determine if traffic is changing or if a particular set of communications or communication patterns are outside the normal expected traffic pattern. These analyses could be used to identify communications patterns that represent potential security threats, represent traffic that is potentially illegitimate, identify legitimate pattern shifts that can be used to re-optimize the communications network, and also to provide early warning of new traffic patterns that may overwhelm the network and cause network outages.

Many modern products have and extremely high level of complexity. Computers, semiconductors, avionics, communications devices, modern automobiles, and medical devices are only a few examples of modern products and technologies that often rely on complex, interlaced systems in order to function properly. These systems often rely on extremely close design and manufacturing tolerances and even small errors can result in catastrophic failure. As such, quality control is extremely important.

Modern quality control methods, such as six-sigma, have substantially reduced defects in modern manufacturing resulting in increased manufacturing yield. However, modern quality control methods still do not address the issue of "cascade failure." Cascade failure occurs when a group of smell variances, all within individual tolerances, conspire to cause overall system failure. Classical quality control may miss each individual variance, but our application would have the ability to identify them collectively.

By taking historical product testing and specification data, one can apply machine-learned BBNs to train a graph model of conditional dependence between testing and manufacturing parameters. This model of parameter dependence can then be used to evaluate individual unit testing results to determine if they comply with the expected pattern. Those products that have individual parameters outside of an expected range given other observed testing parameters can either be flagged for further testing or rejected. The system similarity approach to quality control would allow testers to determine, automatically, if quality parameters as a group are beyond allowable ranges, even if all the individual parameters are compliant.

Operational Security is an extremely complex challenge where the Operational Security Officer must process large amounts of complex, often conflicting information in order to arrive at an appropriate risk assessment. How do disparate sources of seemingly harmless information combine to create a risk? Effective Operational Security involves processing and reviewing a large number of documents and statements. The disclosure of critical information can occur either by means of a single improper disclosure or by the combination of several disclosures that would independently be acceptable. One of the most powerful aspects of BBNs is that they give you an understanding of how the combination of several independent events can produce new information.

An important aspect of any operational security system is to ensure that the data used to develop it and the rules incorporated in it are protected from compromise. This protection can be assured on many layers. First, the models themselves are mathematical abstractions of the data and therefore do not require any underlying data to render a score—the models are severed from the source data. As such, once the models are complete, the source data can be disconnected until needed for additional training. Second, since the solutions described herein support real-time network based scoring, the rules and even the scores need never be disclosed to the system user—rather, a document can be flagged and a specific remedy can be suggested that do not disclose rule sets. Third and finally, if added security is required, the source data itself can be obfuscated with randomly assigned machine names. Since the machine learning technique is driven entirely by evidence and probability distributions, no contextual information need be disclosed to train the system.

To build predictive models, our learning engine requires the data to be in a flat tabular format, such as spreadsheet formats. The data can be numerical or variable character strings, however the data can contain thousands of fields and states—it does not require pre-selection. Often times the raw data, once properly formatted, will be sufficient for model training.

Figure 8:
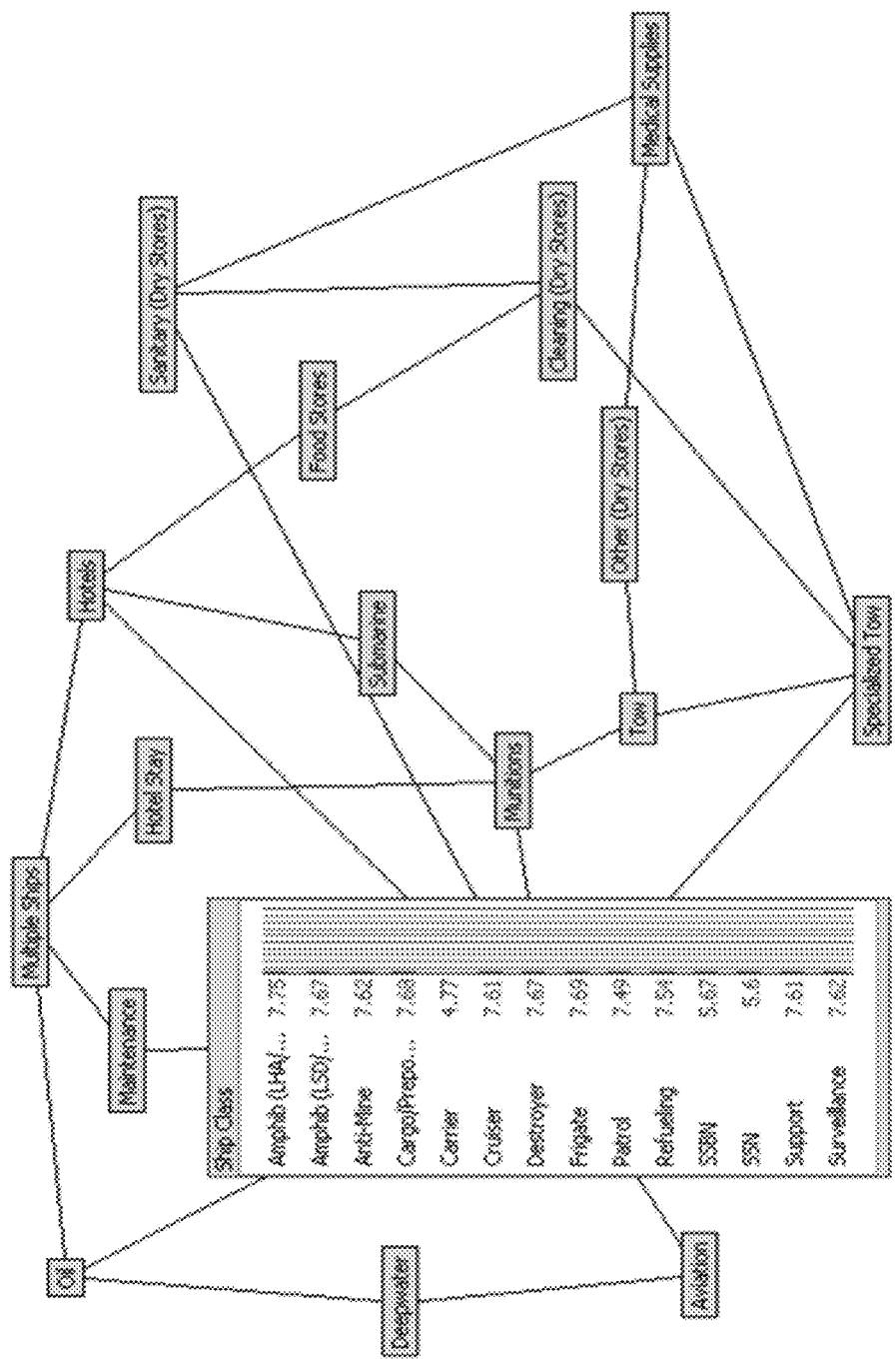
FIG. 8 is a block diagram representing an example of BBN model according to one embodiment of the invention.

Having selected the data, one can use a combination of a fully automated machine learning process and a step-wise operator process to develop the most robust model. The operator begins by overseeing how the software categorizes the data to optimize utility. Once the data has been discretized, the model is developed using our artificial intelligence algorithms with operator oversight. The display in FIG. 8 illustrates conditional dependence between variables and the pathways existing in the model. Notice that the network has multiple branches, that the data is interrelated in a "web", and that the model is transparent and can be easily queried by the user; one of the strengths of multivariate BBNs. This web allows a user to understand not just the risk of an outcome, but why and where that risk is coming from.

One can infer information from the structure of the network. For example, expected Ship Class in port is related to the variables representing requisitions for Oil, Aviation parts, Maintenance, Hotels, Sanitary (Dry Stores), Munitions and Specialized Tow. The variables not directly connected to Ship Class still have an effect on ship class, but they do this together with other observable variables.

These models can then be used to monitor document structure and to determine if a new document matches existing patterns consistent with secure documents, or if the document diverges from an established pattern of secure documents by scoring the degree to which a new document is similar to known "safe" documents. Not only can the score provide an assessment of risk for a given document, it can also identify the areas in which the document diverges from the gold standard and provide an indication of corrective action.

New social media, such as Facebook, Twitter, and peer-to-peer sharing, are changing the ways that people are interacting with one another. However, with new methods of interaction arise new challenges in network management and new security threats. By developing a real-time pattern comparison application, we could dynamically monitor social networks to identify changes in the network that have implications for network security, network management, and potential identification of real-world threats such as child predators, phishing scams, flash mobs, and confidence artists who use social networking to prey on their victims.

Embodiments of the invention would allow large data sets of social media interactions to be used to train a machine-learned BBN that would be representative of social networking patterns within a population. These estimated patterns could then be compared with observed patterns to determine if traffic is changing or if a particular set of communications or communication patterns are outside the normal expected traffic pattern. The system could dynamically score changes in network structure that could then be used to identify patterns of suspicious behavior or impending events that would allow network administrators to take proactive action to manage the network or allow for proactive alerts to potential victims who could then take early protective and preventative action.

Another embodiment of the invention would allow the user to model large biological networks using biomarker data such as gene or protein expression, quantization of microRNA or gene sequencing or other methods for biomarker collection. Biological systems are complex systems, and often these systems can become dysregulated, leading to illness. However, many diagnostic tests currently measure only a limited range of biomarker values and classify these values as normal or abnormal. However, a given individual can have a single abnormal value while still being healthy (false positive); conversely, other individuals can have a collection of values that are each just shy of abnormal and be considered normal through test results while actually being sick (false negative). This embodiment contemplates analyzing the biology of the patient as a system and comparing this biology to known healthy or unhealthy biological systems to evaluate individual health on a systemic level.

In one embodiment of the invention, a group of cytokines and chemokines collected from serum and wound effluent in injured patients can be encoded into two networks for similarity scoring—a network of those whose wounds healed and those whose wounds did not heal. Each of these populations is to train similarity models (106). New sampling of cytokine/chemokine measurements are then input into the Detection Module (107) and scored to determine their similarity to the biological system of an individual who healed, and an individual who did not heal. Based on the similarity to either biological system, a clinician can determine if the individual patient biology looks more like a well regulated immune system (healing) or a dysregulated immune system (not healing) and adjust treatment accordingly.

In another embodiment of the invention, a series of gene sequences or other biomarkers collected from cancer tumors can be encoded into two networks for similarity scoring—a network of those who remained disease free and those whose disease progressed. Each of these populations is to train similarity models (106). New sampling of biomarker measurements are then input into the Detection Module (107) and scored to determine their similarity to the biological system of an individual who remained disease free, and an individual whose disease progressed. Based on the similarity to either biological system, a clinician can determine if the individual patient biology looks more like healthy (non-cancerous) tissue and would be expected to remain disease-free, or more like diseases (cancerous) tissue, in which case prophylactic chemotherapy could delay or prevent disease recurrence and/or progression.

Figure 9:
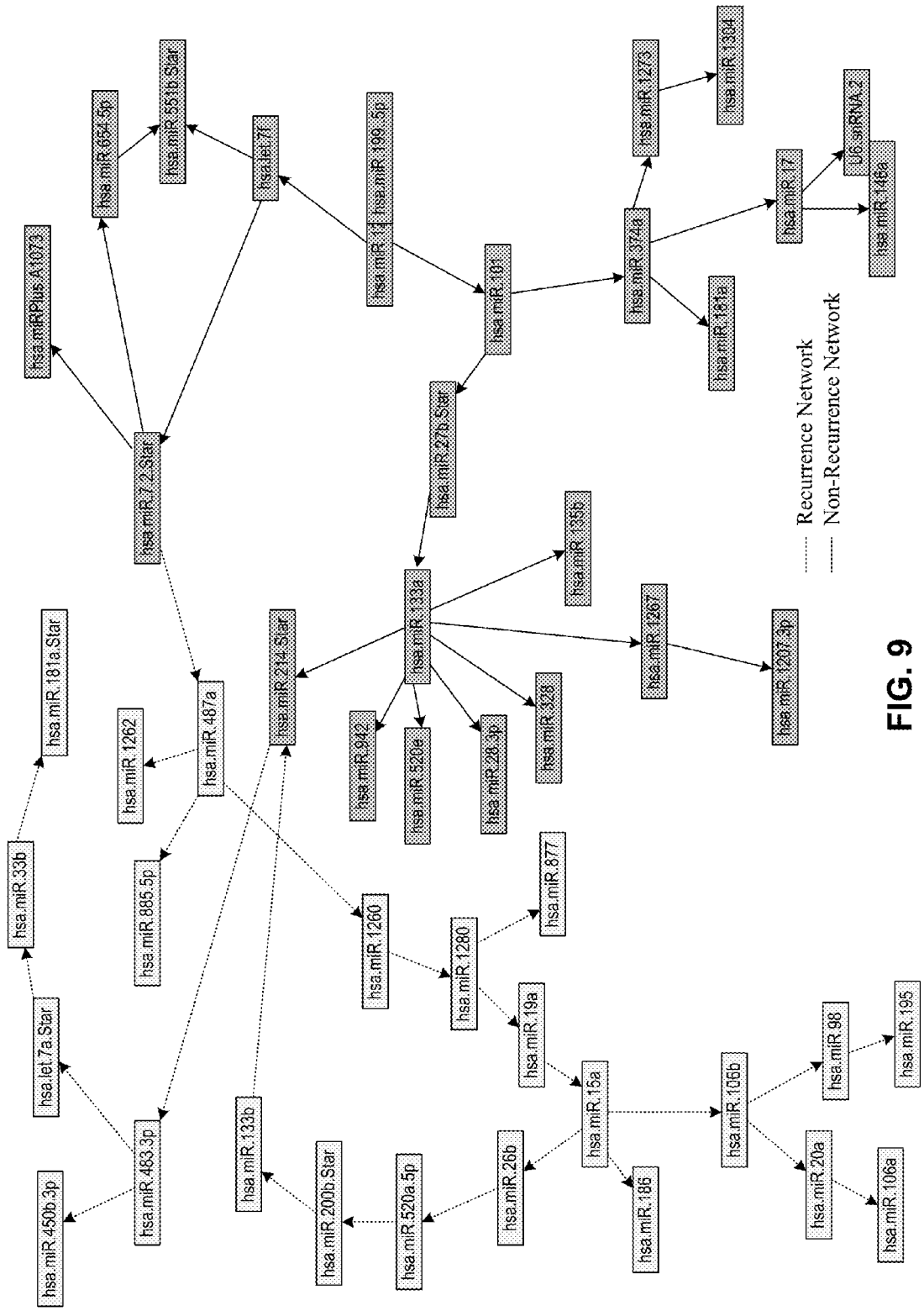
FIG. 9 is a block diagram representing an example of BBN model according to another embodiment of the invention.

FIG. 9 is a block diagram illustrating an example of a biology BBN model according to one embodiment of the invention. In this example, referring to FIG. 9, the objective is to use the fully unsupervised machine-learning engine to learn the structure of underlying information domains in different populations—in this case, recurrent and non-recurrent melanomas. We also used our analysis of the biomarker population data to identify a study set or sets with sufficient population to produce robust models. We built separate biomarker only models from the combined miRNA studies for patients with recurrent melanoma and patients whose melanoma did not recur. Through three stages of modeling and variable pruning, we found that the recurrence and non-recurrence networks are significantly different. This indicates that theses biomarkers may show promise in predicting recurrence in patients with melanoma using a network similarity analysis approach. These may also suggest biomarkers signatures that are unique to recurrent and non-recurrent tumors. After three stages of pruning networks trained using the miRNA biomarker studies, the network of biomarkers for patients with recurrent melanoma is significantly different from the network of biomarkers for patients whose melanoma did not recur. As of the focused modeling stage, the two networks shared only 2 biomarkers in common. This would indicate that the miRNA regulatory networks are different in the recurrent vs. the non-recurrent tumors.

According to some embodiments, the application for anomaly detection combines machine-learning algorithms and an n-dimensional information space to develop dynamic machine-learned Bayesian Belief Networks (ml-BBNs). The ml-BBNs have the ability to respond to incomplete or partial information to identify and respond to new anomalies in real time. For the technical approach to be successful, it needs to accomplish the following: 1) identify, analyze and attribute new cyber anomalies; 2) handle incomplete and dirty data; 3) support mixed initiative analysis and deliver suitable response in real time; and 4) compare streaming data against models of expected data to identify and respond to new attack designs in real time.

In one embodiment, the technical approach consists of three key components: 1) machine learning, 2) Bayesian Belief Networks (BBNs), and 3) a scoring algorithm for interpreting the output of the BBNs. Together, (1) and (2) are referred to as machine-learned Bayesian Belief Networks (ml-BBNs). Embodiments use patterns of conditional independence between cyber attack features to derive patterns of cyber attacks that can be used to identify attacks in process and deliver an appropriate response.

One value of ml-BBNs is that it addresses the inherent problems of the signature approach to cyber security, malware, and network monitoring—that each unique signature must be analyzed, attributed, and catalogued prior to being identified and isolated. Another value of ml-BBNs is that it allows for the consideration of entire system that must maintain stasis (such as biology or quality control) and the ability to detect dysregulation at the system level rather than by simply looking at a limited set of features. This approach uses the combinatorial approach that BBNs allow. Learning BBNs present an extremely high level of potential complexity. Each network has a potential $3^{((n(n-1))/2)}$ structures, where n represents the number of features in the information domain. This means that a cyber security dataset of 10 features has 345 potential solutions. Therefore, machine learning allows operators to construct an ml-BBN that converts an np-hard into an np-complete problem. This allows the technical approach to derive models that are asymptotically complete representations of all possible network patterns. As such, they have the ability to observe partial patterns evident in new attacks that will allow users to analyze, identify, and attribute anomalies in process, even as partial data is coming in time series.

A significant strength of the application methodology described throughout is the use of ml-BBNs as our method for encoding potential rule sets. The ml-BBNs are directed acyclic graphs that represent networks of conditional independence between variables. As such, they are a computationally compact and efficient way to represent highly complex rule sets. Billions of potential combinations can be represented in objects (e.g., extensible markup language or XML) of only a few megabytes. More importantly, because ml-BBNs are an n-dimensional structure, any node in the network can be estimated by any other node—given a known set of information, the model automatically estimates all other nodes in the domain space. Not only can estimates be calculated using partial information, but it also means that scenarios can be probabilistically evaluated even if they have never occurred before. This allows the ml-BBNs to derive posterior estimates of outcome, along with estimates of evidence (confidence), using whatever givens are available at the time of decision. The ml-BBNs can adjudicate persistently even in the presence of high amounts of missing or incorrect data.

Another value of BBNs is that they are computationally efficient. The specific profile patterns identified in the validated ml-BBN can be used to score the likelihood of anomalies in real time using inbound streaming data, and the attributions can be completed in microseconds. The ml-BBN can rapidly score the event using partial information based on its similarity to other events and anomalies. Further, since model validation involves testing model performance using different levels of data completeness, each score will have an associated confidence metric that can be used to set policies as to when action should be taken. The application uses multiple series of classifiers to 1) detect anomalies, 2) score detected anomalies for risk, and 3) statistically determine the most effective countermeasures/actions based on given information. In a fully automated implementation, this results in mixed-mode countermeasure deployment in microsecond time as well as real-time countermeasure adjustment as new data becomes available.

One of the ml-BBNs envisioned in this application uses complex pattern comparison and estimation to identify novel anomalies in process. One of the challenges in security is that many breaches occur without clear indication of a breach. Further, these attacks often consist of complex sequences of events that have historically only been detected by luck. The ml-BBNs allow us to identify aberrant patterns in real time that may be a new attack form for which a signature is still unknown. By identifying clusters of aberrant patterns, we can adjudicate anomalous activity in real time (even if novel) and rapidly deploy countermeasures.

In one embodiment, the development and deployment of the application requires: 1) data set identification and curation (which includes enhanced documentation, semantic normalization, and data curation), 2) ml-BBN development (which includes preliminary training, global training, naïve training, and focused training), 3) model validation and testing (which includes quality control validation, statistical validation, and performance and availability testing), 4) BBN interpretation, and 5) scoring (including anomaly scoring and flexible adjudication).

During the data set identification and curation, an appropriate training data set needs to be identified for use in training the ml-BBNs. It is important that this training set possess three characteristics: 1) it must possess sufficient statistical power, 2) it must be representative of the population in which the ml-BBNs are to be applied, and 3) it must contain some subset of samples that have been "adjudicated." Once the training data has been identified, three subtasks must be completed:

Subtask 1: Enhanced Documentation. This task consists of using statistical analysis to compare the actual data sample to provided documentation and enhancing documentation where necessary.

Subtask 2: Semantic Normalization. This task consists of parsing and normalizing data into features that are useful for modeling. This also involves conforming data to client nomenclature to ensure usability.

Subtask 3: Data Curation. This consists of creating two final curated dataset packages. One package consists of datasets to be used for training the ml-BBNs. The other is an independent hold-out test set.

Each stage of ml-BBN model development consists of training multiple ml-BBN classifier sets: 1) an anomaly detection classifier group (is this pattern unusual?), 2) an adjudication classifier group (is this pattern dangerous?) and a 3) countermeasure classifier group (what action do I take?). We use these classifiers collectively as a multi-step scoring and adjudication process to identify anomalous activity, score potential events, and deploy countermeasures. The BBN networks are trained using a machine-learning genetic algorithm. Learning from data is a hard problem—in particular learning Bayesian network structure is NP-hard. This means that exhaustive search is required. This necessitates the need for heuristic search in all but the smallest domains; however, existing heuristic techniques have limitations relative to speed and computing power for complex datasets. The machine learning algorithms are a heuristic search algorithm with greedy learning and learning queues that form a genetic algorithm. The use of learning queues reduces seed value bias and results in an exhaustive search space.

In one embodiment, the search algorithm is enhanced by the AD+Tree data caching and query system. An AD+Tree is a modified Dynamic AD-tree. It allows for an order of magnitude more data to be cached for learning without reduction in speed. This allows us to perform exhaustive search while maintaining speed and supports the process of Queue Learning. It has been shown that this modified tree structure allows us to consider an order of magnitude more data, allowing us to consider more complex problems in less time on inexpensive computing hardware. The second innovation is queue learning. Queue learning implements very efficient searches, thus providing additional flexibility to heuristics searching for the optimal model structure. Queue learning seeds multiple learning queues in parallel, each of which explores a different potential solution set simultaneously in parallel. Queue Learning's benefits are twofold; first, Queue Learning again improves speed and efficiency; second, Queue Learning has been shown to perform 1%-5% better than a standard heuristic algorithm in terms of model quality score.

In one embodiment, several scoring metrics can be utilized, including: Minimum Description Length (MDL), also known as the Bayesian Information Criterion (BIC), as well as Bayesian Scoring (BDe). Minimum Description Length scoring provides a measure of the quality of a model. It trades off goodness of fit and model complexity. Goodness of fit is measured as the likelihood of the data given the model. Model complexity equals the amount of information required to store the model, subject to an inflator/deflator set by the user.

In development of the BBNs, a step-wise modeling process is used to ensure the most robust model with the highest utility. This is an iterative step-wise process, consisting of several steps which may be repeated as necessary given operator domain knowledge. The goal of the process is to streamline variable selection and preparation to produce the optimum outcome. The process for model includes: 1) Preliminary Training (e.g., identifying appropriate machine learning parameters, identifying base level of correlation in the dataset, identifying obvious correlations that are interfering with the base level (confounding features), and identifying and removing feature analogs (i.e., features that are proxies for one another and reduce accuracy)), 2) Global Training (e.g., setting appropriate machine learning parameters, making appropriate changes to data set, including removal of analogs and confounding features and further binning, and running full "queue learning" to observe global data structure and strong meaningful correlations), and exploring model relative to literature and domain expertise as a "sanity check" and to analyze relationships), 3) Naïve Training (e.g., performing linear naïve modeling on dependent outcomes of interest to identify relative contribution of features, and developing quantitative contribution report), 4) Focused Training. The run "queue learning" uses only subsets of variables identified in prior steps to get a more focused network than the one obtained in global modeling. By excluding certain variables the remaining ones are explored more exhaustively. Focused modeling is superior to a naïve model as interdependence among features related to the target(s) is taken into account when analyzing the combined effect of several features on the target(s). The focused model is explored and preliminary reports are automatically created.

In order to properly validate the models, three types of validation must be performed: 1) Quality Control Validation (e.g., manual testing of the model using specific data instances to confirm fidelity and classification accuracy), 2) Statistical Validation (e.g., using a hold-out independent test set to validate model robustness and performance. It also includes developing statistics for model performance by completeness of instance, to be used in setting policy rules), and 3) Performance and Availability Testing (e.g., using real-time scoring to develop adjudication speed benchmarks in microseconds for each specific model).

During the step-wise modeling process, all ml-BBNs trained are tested using a train-and-test cross-validation methodology as well as a withheld de novo validation set. In one embodiment, the train-and-test cross validation method requires the data set to be randomized into N number of training and testing pairs, such that each pair consists of a test set consisting of 1/N fraction of records, while the training set is 1−1/N fraction of records. Each train and test pair is unique a model is trained with each training set and the matching test set is input into the model, generating a case-specific prediction for each record for variables of interest. The test set predictions are then used to calculate a receiver-operator characteristic (ROC) curve for each test set. The curve is calculated by comparing the predicted value for each variable to the known value in the test set on a case-specific basis. This curve is then used to calculate area-under the curve (AUC), a metric of overall model quality, and positive predictive value (PPV), a measure of the probability that a positive is a true positive. The same exercise is conducted using the independent de novo validation set. These results, collectively, represent the validation statistics for the ml-BBNs.

In one embodiment, the BBN interpretation includes combining the ml-BBNs, encoded in XML, with a software application and matching configuration parameters such that the XML BBN, application, and configuration support scoring new events based upon known features. These three components, collectively, are referred to as a "Microstack" as they are intended to be embedded within a larger operating environment.

Figure 7:
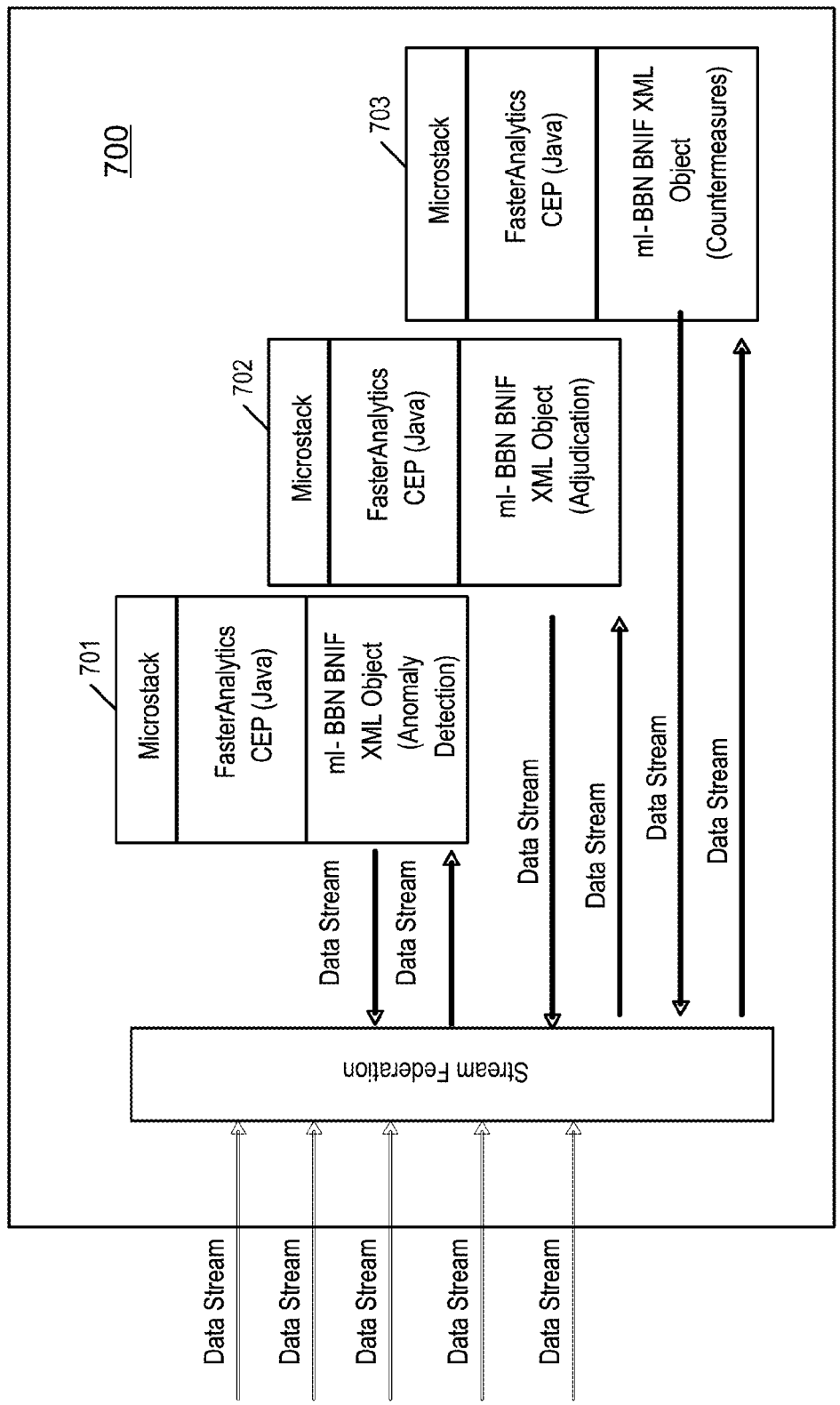
FIG. 7 is a block diagram illustrating architecture of a detection module according to one embodiment of the invention.

FIG. 7 is a block diagram illustrating architecture of a detection module according to one embodiment of the invention. Detection module 700 may be implemented as part of detection module 107 of FIG. 1. Referring to FIG. 7, data from new observed events flows into microstacks 701-703, while estimates derived from the ml-BBNs flow out. Each of microstacks 701-703 includes at least one ml-BBN file that details the structure and joint probability distribution trees that support the ability of a person or computer to calculate posterior probabilities using known data and the ml-BBN. The application, known as Complex Event Processor (or CEP), encoded in Java or another programming language, reads the ml-BBN XML file and uses this to establish the conditional probability logic and joint probability distributions such that a computer can calculate posterior probabilities from observed known data or evidence.

A configuration file specifies for the CEP which ml-BBN XML file to load, where to find the evidence for calculating posterior probabilities, which posterior probabilities to calculate, and which specific pieces of information to output. The types of data being returned by the microstacks are probabilities. In one embodiment, the actual probabilities returned vary on which model set is being used for adjudication:

The Countermeasure ml-BBN provides a series of probability estimate for one feature: type of event. This consists of a likelihood assigned to each event type that would allow the user to identify the most likely event type and appropriate response.

The Adjudication ml-BBN provides two probabilities for one feature: whether the event is harmful of not. These two probabilities would allow the user to identify whether the event is more likely to be benign or harmful.

The Anomaly Detection ml-BBN is used to provide a posterior probability for each feature in the model using all the other known features in the model. In this instance, if a model has features A, B, C, and D; A, B, and C are used to calculate a posterior probability distribution for D; B, C, and D are used to calculate a posterior probability distribution for A; C, D, and A are used to calculate a posterior probability distribution for B; and A, B, and D are used to calculate a posterior probability distribution for C.

In one embodiment, scoring is the part of the process that interprets the output of the BBN Interpretation Microstacks. The scoring has two components:

An Anomaly Scoring algorithm that converts the posterior probabilities forms the Anomaly Detection ml-BBN into a single score.

Flexible Adjudication that allows the user to make effective use of the scores and posterior probabilities generated by the microstacks and Anomaly scoring algorithm.

The Anomaly Scoring algorithm is designed to tell us, based on multivariate probabilistic pattern comparison, how similar an event is to a historic, adjudicated event that is either Benign or Harmful. This works by having the Microstack perform calculation of posterior probabilities given observed features of a new event, an ml-BBN, and a configuration file. The Microstack outputs a posterior probability for each feature in the ml-BBN given all other known features for the event. It then compares the estimated posterior probability of feature Y to the known observed value of feature Y. To the extent that these match, they are similar. To the extent they do not match, they are dissimilar. The total Similar or Dissimilar features can be summarized across the entire model to calculate an Anomaly Score, which can also be referred to as a Similarity Score, Dissimilarity Score, or Novelty Score. The Flexible Adjudication component consists of statistical and ROC testing to determine assigned Sensitivities and Specificities for different levels of Countermeasure Estimates, Adjudication Estimates, and Similarity Scores. These allow the user to tune the system to their specific risk/resource threshold.

An embodiment of the invention includes a method for creating a model to identify novel and anomalous events, using machine learning algorithms on relevant data about a set of events, where the data includes data relevant to the events, relevant to the outcomes and relevant to the specific subject domain, to build a BBN that can derive posterior probabilities and scores describing the degree to which a given event is novel relative to historical events. The posterior probabilities are used in a scoring algorithm to adjudicate whether an event is novel or not novel. Alternatively, the posterior probabilities are used in a scoring algorithm to adjudicate whether an event is harmful or not harmful. In one embodiment, a known event feature is compared to the estimated event feature to determine if that feature conforms to expectations. The comparison is performed for all features within the BBN such that each individual feature is estimated using the subset of all known features excluding the feature being estimated, and this feature is repeated for all features in the BBN.

In one embodiment, each feature is assigned a score to represent whether or not it conforms to expectations, and these scores are summed across all features in the BBN to calculate a similarity score. The historic data may come from biomarkers, social media interactions, internet protocol communications, simple mail transfer protocol (SMTP) sessions, or other forms of data collection or electronic machine to machine communications. The historic data may also come from information pertaining to software executables, packaged or otherwise, including information included in the executable header, features of the executable, origins of the executable, or behaviors of the executable. The historic data may also come from written files including web pages, clinical charts, pathology reports, brochures, pictures, requisition requests, chat groups, manuals, self-assessment questionnaires, standard operating procedures, financial disclosures, product specifications, press releases and statements in public forums.

In one embodiment, the data may represent documents related to the development of new systems and capacities, including technology development, building of new facilities or systems architecture. The data may represent records of wired telephone communications, email communications, mobile telephone communications, instant messenger communications, or other forms of electronic person to person communications. The data may represent test and specification parameters pertaining to specific units or lots of manufactured goods. The data may represent social media records including posts on social networking web sites, posts on peer-to-peer message syndication services, photographs on social media web sites, personal or professional information posted on social networking web sites, or posts made to chat forums or bulletin boards. The data may represent quantified biological features such genetic sequences, genetic expression, cell signaling pathways, peptides, proteins, or blood chemistries.

In one embodiment, the new data for adjudication may represent internet protocol communications, SMTP sessions, email sessions, or other forms of electronic machine to machine communications. The new data for adjudication may represent information pertaining to software executables, packaged or otherwise, including information included in the executable header, features of the executable, origins of the executable, or behaviors of the executable. The new data for adjudication may represent web pages, brochures, pictures, requisition requests, chat groups, manuals, standard operating procedures, financial disclosures, product specifications, press releases and statements in public forums. The new data for adjudication may represent documents related to the development of new systems and capacities, including technology development, building of new facilities or systems architecture. The new data for adjudication may represent records of wired telephone communications, email communications, mobile telephone communications, instant messenger communications, or other forms of electronic person to person communications. The new data for adjudication may represent test and specification parameters pertaining to specific units or lots of manufactured goods. The new data for adjudication may represent social media records including posts on social networking web sites, posts on peer-to-peer message syndication services, photographs on social media web sites, personal or professional information posted on social networking web sites, or posts made to chat forums or bulletin boards.

Figure 10:
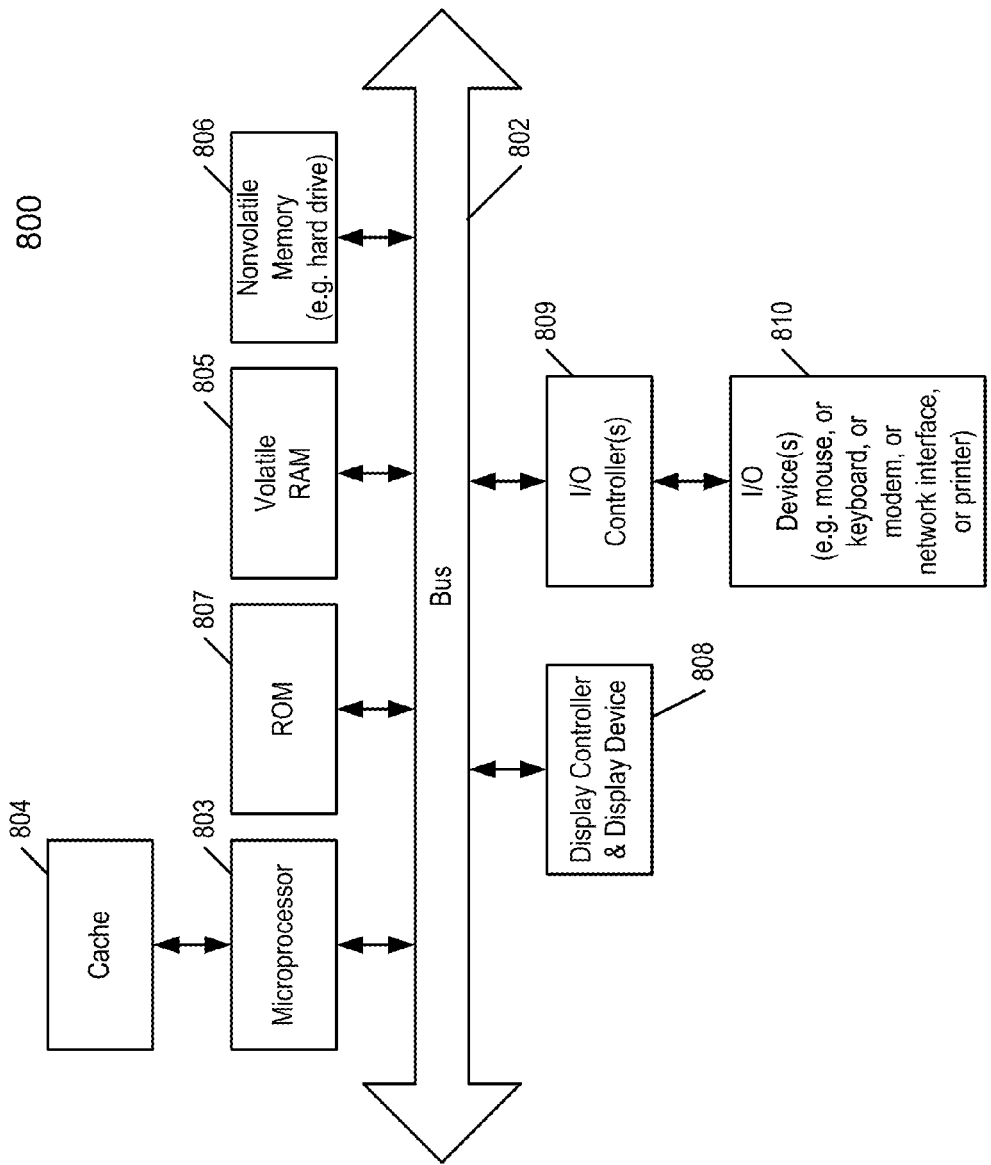
FIG. 10 is a block diagram of a data processing system, which may be used with one embodiment of the invention.

FIG. 10 is a block diagram of a data processing system, which may be used with one embodiment of the invention. For example, the system 800 shown in FIG. 10 may be used as a client and/or a server of FIG. 1. Note that while FIG. 10 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention.

As shown in FIG. 10, the computer system 800, which is a form of a data processing system, includes a bus or interconnect 802 which is coupled to one or more microprocessors 803 and a ROM 807, a volatile RAM 805, and a non-volatile memory 806. The microprocessor 803 is coupled to cache memory 804. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 10 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for anomaly detection, the method comprising:
   extracting a plurality of features from a set of data for anomaly detection;
   applying a Bayesian belief network (BBN) model to the data set, including for each particular feature of the plurality of features, performing an estimate of the particular feature using known observed values of remaining features of the plurality of features to generate a posterior probability for the particular feature; and
   performing a scoring operation using a predetermined scoring algorithm on posterior probabilities of all of the features to generate a similarity score, wherein the similarity score represents a degree to which a given event represented by the data set is novel relative to historical events represented by the BBN model.

2. The method of claim 1, wherein performing an estimate of the particular feature using known observed values of remaining features of the plurality of features comprises comparing an estimated event with a known event associated with the particular feature to determine whether the particular feature conforms to an expectation.

3. The method of claim 2, further comprising assigning a first score for each of the features based on the comparison between the estimated event and the corresponding known event.

4. The method of claim 3, further comprising performing a predetermined mathematical operation on the first scores of all features to derive the similarity score.

5. The method of claim 4, wherein performing a predetermined mathematical operation on the first scores of all features comprises summing the first scores to generate the similarity score.

6. The method of claim 1, wherein the posterior probability associated with each particular feature is used by the scoring operation to adjudicate whether an estimate event is novel given known events associated with the remaining features.

7. The method of claim 1, wherein the posterior probability associated with the particular feature is used by the scoring operation to adjudicate whether an estimate event is harmful given known events associated with the remaining features.

8. The method of claim 1, wherein the data set represents an executable of a software application to be determined whether the executable is malware.

9. The method of claim 1, wherein the data set represents a set of internet transactions to be determined whether the transactions represent illegitimate traffic.

10. The method of claim 1, wherein the data set represents a set social media data to be determined whether a given social media interaction of for benign or malicious purposes.

11. The method of claim 1, wherein the data set represents a set of quality or manufacturing parameters to be determined if the product in question is defective.

12. The method of claim 1, wherein the data set represents biological data to be determined if the patient has underlying biology that is predisposed to illness.

13. The method of claim 1, wherein the data set represents individual documents to be determined if the documents represent a threat of inadvertent disclosure.

14. The method of claim 8, wherein applying a BBN model to the data set comprises:
   applying a first BBN model to the data set to generate a first score representing a likelihood the executable associated with the data is a malware, wherein the first BBN model was trained based on both malware sample data and benign sample data; and
   applying a second BBN model to the data set to generate a second score if the first score is greater than a predetermined threshold, wherein the second BBN model was trained on the malware sample data.

15. The method of claim 14, further comprising applying a third BBN model to the data set to generate a third score if the first score is less than or equal to a predetermined threshold, wherein the third BBN model was trained on the benign sample data.

16. The method of claim 15, further comprising deriving the similarity score based on the second score and the third score.

17. The method of claim 1, wherein the data set represents data of at least one of internet protocol communications, SMTP sessions, and email sessions.

18. The method of claim 1, wherein the data set represents data of at least one of software executables, executable headers, features of executables, origins of executables, and behaviors of executables.

19. The method of claim 1, wherein the data set represents data of at least one of web pages, brochures, pictures, requisition requests, chat groups, manuals, standard operating procedures, financial disclosures, product specifications, and press releases and statements in public forums.

20. The method of claim 1, wherein the data set represents data of at least one of documents related to the development of new systems and capacities, including technology development, building of new facilities or systems architecture.

21. The method of claim 1, wherein the data set represents data of at least one of records of wired telephone communications, email communications, mobile telephone communications, and instant messenger communications.

22. The method of claim 1, wherein the data set represents data of at least one of test and specification parameters pertaining to specific units or lots of manufactured goods.

23. The method of claim 1, wherein the data set represents data of at least one of social media records including posts on social networking web sites, posts on peer-to-peer message syndication services, photographs on social media web sites, personal or professional information posted on social networking web sites, or posts made to chat forums or bulletin boards.

24. The method of claim 1, wherein the data set represents data of at least one of biological systems data including blood chemistry data, genetic sequences, genetic and protein expression data, peptide and cytokine/chemokine data, as well as other biomarkers.

25. A non-transitory machine-readable medium having instructions stored therein, which when executed by a processor, cause the processor to perform a method for anomaly detection, the method comprising:
  extracting a plurality of features from a set of data for anomaly detection;
  applying a Bayesian belief network (BBN) model to the data set, including for each particular feature of the plurality of features, performing an estimate of the particular feature using known observed values of remaining features of the plurality of features to generate a posterior probability for the particular feature; and
  performing a scoring operation using a predetermined scoring algorithm on posterior probabilities of all of the features to generate a similarity score, wherein the similarity score represents a degree to which a given event represented by the data set is novel relative to historical events represented by the BBN model.

26. The non-transitory machine-readable medium of claim 25, wherein performing an estimate of the particular feature using known observed values of remaining features of the plurality of features comprises comparing an estimated event with a known event associated with the particular feature to determine whether the particular feature conforms to an expectation.

27. The non-transitory machine-readable medium of claim 26, wherein the method further comprises assigning a first score for each of the features based on the comparison between the estimated event and the corresponding known event.

28. The non-transitory machine-readable medium of claim 27, wherein the method further comprises performing a predetermined mathematical operation on the first scores of all features to derive the similarity score.

29. The non-transitory machine-readable medium of claim 28, wherein performing a predetermined mathematical operation on the first scores of all features comprises summing the first scores to generate the similarity score.

30. The non-transitory machine-readable medium of claim 25, wherein the posterior probability associated with the particular feature is used by the scoring operation to adjudicate whether an estimate event is novel given known events associated with the remaining features.

31. The non-transitory machine-readable medium of claim 25, wherein the posterior probability associated with the particular feature is used by the scoring operation to adjudicate whether an estimate event is harmful given known events associated with the remaining features.

32. The non-transitory machine-readable medium of claim 25, wherein the data set represents an executable of a software application to be determined whether the executable is malware.

33. The non-transitory machine-readable medium of claim 32, wherein applying a BBN model to the data set comprises:
  applying a first BBN model to the data set to generate a first score representing a likelihood the executable associated with the data is a malware, wherein the first BBN model was trained based on both malware sample data and benign sample data; and
  applying a second BBN model to the data set to generate a second score if the first score is greater than a predetermined threshold, wherein the second BBN model was trained on the malware sample data.

34. The non-transitory machine-readable medium of claim 33, wherein the method further comprises applying a third BBN model to the data set to generate a third score if the first score is less than or equal to a predetermined threshold, wherein the third BBN model was trained on the benign sample data.

35. The non-transitory machine-readable medium of claim 34, wherein the method further comprises deriving the similarity score based on the second score and the third score.

36. A data processing system, comprising:
  a processor; and
  a memory storing instructions, which when executed from the memory, cause the processor to
    extract a plurality of features from a set of data for anomaly detection;
    apply a Bayesian belief network (BBN) model to the data set, including for each particular feature of the plurality of features, perform an estimate of the particular feature using known observed values of remaining features of the plurality of features to generate a posterior probability for the particular feature; and
    perform a scoring operation using a predetermined scoring algorithm on posterior probabilities of all of the features to generate a similarity score, wherein the similarity score represents a degree to which a given event represented by the data set is novel relative to historical events represented by the BBN model.

* * * * *